United States Patent [19]

Karam

[11] 4,332,924
[45] Jun. 1, 1982

[54] RECIRCULATING POLYMERIZATION METHOD AND APPARATUS WITH EVAPORATIVE COOLING

[75] Inventor: Henry J. Karam, Midland, Mich.

[73] Assignee: The Dow Chemical Company, Midland, Mich.

[21] Appl. No.: 141,749

[22] Filed: Apr. 18, 1980

Related U.S. Application Data

[63] Continuation of Ser. No. 922,013, Jul. 5, 1978, abandoned.

[51] Int. Cl.³ ............................................. C08F 2/02
[52] U.S. Cl. .................................................. 526/64
[58] Field of Search ......................................... 526/64

[56] References Cited

U.S. PATENT DOCUMENTS

| | | | |
|---|---|---|---|
| 2,852,501 | 9/1958 | Richard | 526/64 |
| 3,550,669 | 12/1970 | Lippert | 159/6 |
| 3,714,123 | 1/1973 | Mancini | 526/64 |
| 3,917,577 | 11/1975 | Trieschmann | 526/64 |
| 4,082,910 | 4/1978 | Buechner | 526/64 |
| 4,200,713 | 4/1980 | Wingler | 526/64 |
| 4,217,431 | 8/1980 | Zacher | 526/64 |

*Primary Examiner*—Paul R. Michl
*Attorney, Agent, or Firm*—R. B. Ingraham

[57] ABSTRACT

A recirculating coil polymerizer is provided which uses evaporative cooling to maintain polymer temperature.

7 Claims, 1 Drawing Figure

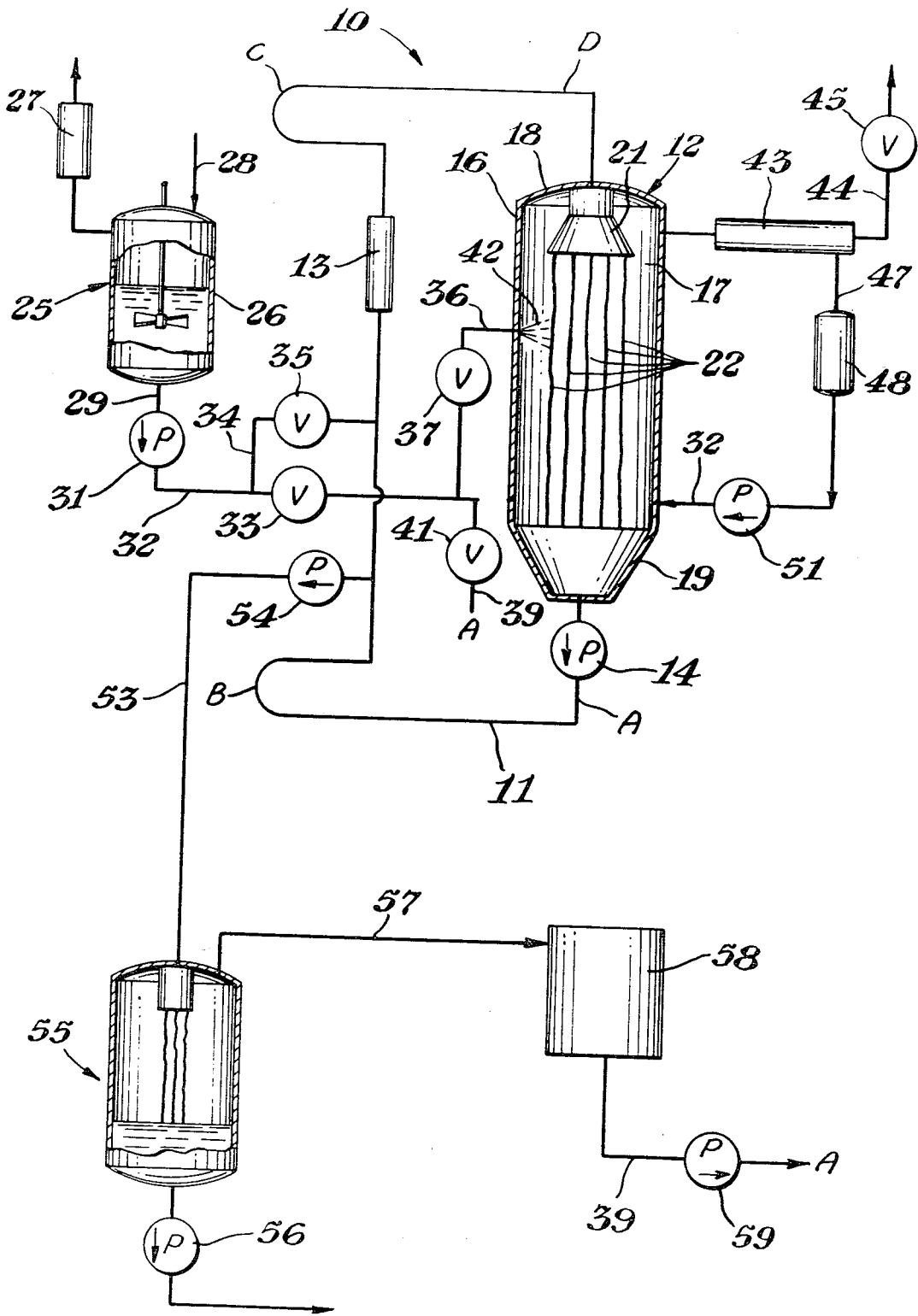

RECIRCULATING POLYMERIZATION METHOD AND APPARATUS WITH EVAPORATIVE COOLING

This application is a continuation of application Ser. No. 922,013 filed July 5, 1978 now abandoned.

For many years tubular reactors have been considered highly desirable for the conversion of monomeric materials to polymers and particularly in the conversion of monomeric materials to thermoplastic polymers. Tubular reactors generally can be prepared from pipe and thereby provide low initial cost and offer the possibility of high heat transfer as well as the convenience of being fabricated from readily available materials. Such tubular reactors have been successfully employed for continuous polymerizations wherein the conversion of monomer to polymer is low and the amount of polymer is relatively low or a large quantity of solvent for the polymer is present or in instances where the polymerization reaction is conducted at temperatures well above the melt temperature of the polymer being produced. One particularly desirable form of tubular reactor is known as the recirculating coil reactor which, in essence, comprises a tubular reactor which forms a closed loop and has a pump therein for the recirculation of material within the so-called coil or closed loop. Generally, material to be polymerized is added to the loop at one location and at another location material is removed from the loop at a rate about equal to the rate of feed to the loop. Typical recirculating coil or closed loop reaction systems are described in U.S. Pat. Nos. 2,769,804; 2,989,517 and 3,035,033. Such reactor systems frequently have difficulty where the material produced therein or processed therein is a viscous polymerizing mass. Frequently, polymer will accumulate on the walls of the reaction vessel effectively decreasing the volume of the vessel and therefore the residence time of material is being fed to the reactor at a constant rate as the polymer builds up or accumulates on the walls of the reactor. The heat transfer from the reaction mixture to a heat-exchange fluid circulating on the outside of the reactor is subsequently reduced. In general, such recirculating reactors employed for the polymerization of materials which tend to accumulate on the walls thereof periodically must be cleaned by one means or the other. Frequently, such cleaning requires disassembly and sand-blasting. Oftentimes, such reaction systems are not particularly energy efficient.

It would be desirable if there were available an improved method for polymerization which offered a reduced tendency for material to accumulate on the walls of the reactor.

It would also be desirable if there were available an improved recirculating coil polymerizer which readily operated with viscous material.

It would also be desirable if such a polymerizer and method of operation thereof offered a convenient means to remove the heat of reaction therefrom.

These benefits and other advantages in accordance with the present invention are achieved in a continuous process for the polymerization of one or more polymerizable monomers which on polymerization liberate heat and form polymer wherein, a first stream portion containing polymerizable material is passed to a reactor to form a second stream portion, the reactor having the flow configuration of a closed loop or circuit, the second stream portion being circulated within and around the closed loop, the second stream portion being maintained at a polymerizing temperature to cause at least a portion of the polymerizable material to polymerize and form polymer, the second stream portion being maintained under a pressure sufficient to prevent vaporization thereof, removing a third stream portion from the reactor at a rate about equal to the rate of addition of the first stream portion, the third stream portion containing a greater amount of polymer than the first stream portion, the improvement which comprises providing within the loop of the reactor a region of lower pressure wherein at least a portion of the second stream portion vaporizes, thereby removing a desired amount of heat from the second stream portion.

Also contemplated within the scope of the present invention is an improved polymerization reactor, the reactor comprising in cooperative combination a reaction vessel generally in the configuration of a closed loop, a circulating means adapted to circulate a viscous liquid material about the closed loop, a supply or feed means in communication with the interior of the reactor adapted to supply reaction materials to the reactor, a discharge means in operative communication with the reactor adapted to remove materials therefrom, the improvement which comprises an evaporation chamber integral within the closed loop, the evaporation chamber adapted to receive and discharge material flowing within the loop, the chamber providing a vapor space into which vapor from the material circulating within the loop can pass and thereby provide evaporative cooling for said material.

Further features and advantages of the present invention will become more apparent from the specification taken in connection with the drawing wherein the FIGURE schematically depicts a polymerization apparatus in accordance with the present invention generally designated by the reference numeral 10.

The apparatus 10 comprises in cooperative combination a generally tubular reaction vessel 11. The reactor 11 is of closed loop configuration and has disposed therein an evaporation chamber 12, a mixing means 13 and a forwarding circulating means or pump 14. The evaporation chamber 12 comprises a hollow housing 16 of a dimension greater than the remainder of the loop 11. The housing 16 defines therein a vapor space 17. The housing 16 has an upper end 18 and a lower end 19. A discharge head 21 is disposed within the space 17 adjacent the upper end 18 of the housing 16 and is in full communication with the tubular reactor portion adjacent thereto. The distribution head 21 has a plurality of outlets (not shown) from which a plurality of falling strands 22 of the reaction mixture issue. The strands 22, as depicted in the FIGURE, fall toward the bottom 19 of the housing 16 which is in communication with circulating means or pump 14. A material supply means 25 is disposed generally adjacent the reactor 11. The supply means 25 comprises an agitated temperature controlled vessel 26 having in operative combination therewith a reflux condenser 27 and in communication with a source of reduced pressure or vacuum generally at the location of the terminal arrowhead adjacent to the condenser 27. A material supply line 28 is also in communication with the interior of the agitated vessel 26. The vessel 26 has a discharge port 29 in communication with a pump or forwarding means 31. The pump 31 discharges to line or conduit 32 having disposed therein valve 33. The line 32 tees to line 34 having disposed therein valve 35. The line 34 adjacent the valve 35 remote from the pump 31 discharges into the reactor 11. Line 32 adjacent valve 33 remote from 31 is in communication with line 36 having a valve 37 disposed therein and line 39 having the valve 41 disposed therein. Line 36 discharges into a spray-head 42 disposed within the space 17 of the housing 16. Space 17 of the housing 16 adjacent the upper end 18 is in operative communication with a condenser 43. The condenser 43 is in operative communication with line 44 having disposed therein valve 45. The line 44 adjacent the valve 45 and remote from the condenser 43 is in operative communication with a vacuum source (not shown). A condensate line 47 is in communication with the condenser 43 and has disposed therein a condenser receiver 48. The receiver 48 is in communication with line 32 which adjacent the receiver had disposed therein a pump or forwarding means 51. A product discharge line or conduit 53 is in operative communication with the reactor 11 at a location generally immediately upstream from the entry of line 34. Line 53 has disposed therein a pump or forwarding means 54. Line 53 remote from reactor 11 and generally adjacent pump 54 communicates with a devolatilizing means 55 having a continuous discharge means 56 such as a pump. In communication with the vapor space of the devolatilizer 55 is a line 57 communicating with a condenser 58. The condenser 58 in turn communicates with the line 39 having a forwarding means or pump 59 disposed therein. In operation of the apparatus in accordance with the present invention, feed material such as polymerizable monomer is supplied to the vessel 26 which optionally may be employed as a prepolymerizer employing ebullient cooling by means of the reflux condenser 27 or alternately merely as a feed tank. Material is discharged from vessel 26 through the pump 31 to line 32. Optionally, the feed to the reactor 11 may be through line 34 and valve 35 into the reactor 11 generally adjacent the mixer 13. The mixer 13 may be of any convenient variety, however, particularly desirable for such an application are the interfacial surface generators, static pipeline mixers, flow invertors, turbulators, or the like. Such devices are well known and one or more of such devices are shown and described in each of the following U.S. Pat. Nos.: 2,852,042; 3,051,452; 3,051,453; 3,128,794; 3,195,865; 3,239,197; 3,620,506; 3,652,061; and 3,794,300.

Alternately, by closing valve 35 and opening valves 33 and 37, feed material is sprayed into the vapor space 17. The choice of the location of the feed will depend generally on the viscosity of the material within the reactor 11 and its ease of admixture with the feed supplied from line 32. If it is desirable to maintain very uniform temperature in the region of the reactor 11, external to the housing 16 and between first and second ends 18 and 19 of the housing 16, the choice generally is to supply the feed by means of line 36. However, if adequate mixing is obtained by the mixer 13, it is generally more convenient to supply the feed by means of line 34. If desired, by the appropriate setting of valves 35 and 37 with valve 33 open, the feed can be proportionated between the two locations. Sufficient feed is provided to fill the portion of the reactor lying between the pump 14 and the first end 18 of the housing 16 external to the housing 16 hereinafter (for convenience) referred to as the loop. Although not depicted in the FIGURES, at least the loop and housing 16 are provided with suitable temperature control jackets as is beneficially the vessel 26, the lines 53 and the devolatilizer 55. Feed material is circulated within the loop and the housing 16 until a desired conversion of monomer to polymer has occurred. Beneficially, the temperature of the material in the loop and the temperature of, for example, a heat exchange liquid jacketing the loop is maintained at about the same temperature so that polymerization occurring within the loop and also within the housing 16 is generally adiabatic except for the heat removed by vaporization of volatile components of the stream at the falling strands 22 and any vaporization which might occur in the event that line 36 supplied feed. It is generally desirable to maintain a minimum inventory of polymerizable material in space 17. Condensable material is volatilized within the chamber 17, passed to the condenser 43 where they are condensed and flow to the receiver 48. From the receiver 48 they are passed to line 32 and advantageously recycled into the reactor 11. When a desired steady state has been reached in the polymerization, material is discharged through line 53 by means of pump 54 into the devolatilizer 55. Volatile materials from the devolatilizer 55 are passed through line 57 to condenser 58 and then in turn optionally pass through line 39 by pump 59 into line 32 and returned to the reactor 11. Devolatilized product is removed from the devolatilizer 55 through line 56.

The apparatus and the process of the present invention can be employed with benefit to polymerize any monomer or mixture of monomers with or without an additional solvent in which the polymer is soluble in the stream being polymerized. Such systems are well known and include styrene-polystyrene, methyl methacrylate-polymethyl methacrylate, 2-ethyl oxazoline-poly-2-ethyl oxazoline, tertiarybutyl styrene-polytertiarybutyl styrene, α-methyl styrene-poly-α-methyl styrene, chlorostyrene-polychlorostyrene, isoprene-polyisoprene, vinyltoluene-polyvinyltoluene, butadiene-polybutadiene, ethylene oxide-polyethylene oxide, and the like.

Beneficially, when metal flow altering devices such as interfacial generators or static mixers are employed in the mixer 13, the diameter of the reactor may be increased for any given polymerization system because of the increase in thermal conductivity from the center of the reactor to the reactor wall provided by the flow altering device. Often, it is desirable to add the monomeric stream to the reactor at a rate that is sufficiently low that streamline flow in the polymer occurs rather than turbulent flow. The method and apparatus of the present invention can be employed most efficiently to provide effluent streams in line 53 which contain about 70 weight percent polymer. Beneficially, in many applications it is desirable to dilute the polymerizable monomer with a solvent which is nonreactive under the conditions of polymerization. Oftentimes, the amount of solvent will range from 5 to 500 percent by weight of the polymer produced and beneficially from 0 to about 50 percent of the polymer.

Beneficially, the conversion of monomer to polymer per pass through the reactor is from about 0.01 to about 2 weight percent and beneficially from about 0.1 to 1 weight percent. In general, the higher the conversion per pass, the greater is the propensity for polymer to form on the walls or wall of the reactor, this varying with the particular material being polymerized. Usually, it is desirable to recirculate material within the reactor at a rate of from about 10 to 500 times the rate at which the feed stream is supplied. A recirculation of 40 to 100 times the feed rate is advantageously employed. In general, the higher the recirculation rate, the lower is the tendency for polymer to form on the reactor wall. When supplying monomer feed into the vaporization chamber 12 such as from the nozzle 42, the spray should not impinge upon the wall of the vaporization chamber as polymerization and build-up of polymer on the chamber wall may occur.

The invention is illustrated but not limited by the following examples wherein all parts and percentages are by weight unless otherwise specified.

EXAMPLE 1

An apparatus generally as depicted in the FIGURE was employed wherein the vessel 12 was about 3 ft. in diameter and had a cylindrical wall of about 3 ft. and a conical bottom of about 2 ft. in height. The coil 11 was 50 ft. of a jacketed 6-inch pipe. Locations A, B, C and D on the coil 11 indicate positions of thermocouplets. A feedstream consisting of 90 percent styrene and 10 percent ethylbenzene containing 300 parts per million based on the combined weight of styrene and ethylbenzene of 1,1-ditertiarybutylperoxycyclohexane was fed to the vessel 26 at a rate of about 108 pounds per hour. The temperature in the vessel 26 was maintained at about 118.3° C. After attaining equilibrium, the mixture in the vessel 26 contained 41.8 percent solids. The inventory in the vessel 26 was about 325 pounds. The effluent from the vessel 26 was passed through the coil 11 through the valve 35, valve 33 being closed. The temperature at location A on obtaining equilibrium was 135° C., at location C 129° C., and at location D 136° C. The pressure within the vessel 12 was 478 millimeters of mercury and the reaction mixture was recirculated within the coil 11 at a rate of about 6600 lb. per hour. The reaction mixture contained 71.7 percent solids. The monomer recycled from the condenser 43 through the line 52 was about 45 pounds per hour and the temperature of the monomer returning to the vessel 12 varied between 14° and 16° C. It was calculated that 0.488 percent monomer was converted to polymer for each pass through the coil 11. The product is a polystyrene having a weight average molecular weight of 263,000 and a number average molecular weight of 114,000 as determined by gel permeation chromatography. The product was of uniform quality.

EXAMPLE 2

Employing the apparatus of Example 1 and a similar feedstream and rate, polystyrene was prepared employing the following conditions: temperature in vessel 26—117.6° C., solids in the vessel 26—42.5 percent, temperature at location A of the polymer—135.6° C., at location C—129° C., at location D—135.6° C. Solids at location A were 75.7 percent and the pressure in vessel 12 was 398 millimeters of mercury. Polymer was recirculated at a rate of about 9600 pounds per hour. Condensate returned through line 32 to vessel 12 was 61 pounds per hour and the condenser had a temperature of 19.6° C. The conversion per pass was calculated to be 0.3575 percent. The product was uniform and satisfactory for injection molding and extrusion.

EXAMPLE 3

The apparatus of Example 1 was employed wherein vessel 26 was maintained at ambient temperature of about 20° C. A feedstream composition of Example 1 was employed at a rate of 120 pounds per hour. Monomer stream was fed to the coil through line 34 and valve 35. When equilibrium was obtained the temperature at location A was 127.8° C.; at location B 127° C.; at location C 128.4° C. and at location D 130° C. The solids in the reaction mixture at location A was 64.5 percent. The reaction mixture was recirculated at a rate of about 8300 pounds per hour. Condensate returning through line 32 to the vessel 12 was 54 pounds per hour at a temperature of 2½° C. The conversion per pass through coil 11 was calculated to be 0.81 percent. The product had a weight average molecular weight of 275,000 and a number average molecular weight of 114,000 as determined by gel permeation chromatography. The product was uniform and acceptable for commercial purposes.

EXAMPLE 4

Employing the apparatus of Example 1, the vessel 26 was maintained at ambient temperature and a feedstream of 92.5 percent styrene and 7.5 percent ethylbenzene containing 250 parts per million of 1,1-ditertiarybutylperoxycyclohexane was fed at a rate of 120 pounds per hour through the line 34 and valve 35 to the coil 11. After reaching equlibrium, the temperature at coil 11 was 130° C.; at location B 139.8° C.; at location C 136.2° C.; and at location D 142° C. The reaction mixture at location A was 74 percent solids. The pressure in vessel 12 was 390 millimeters of mercury. The reaction mixture was recirculated at a rate of about 6600 pounds per hour. Condensate was fed through line 32 to the vessel 12 at a rate of about 64 pounds per hour. The condensate had a temperature of 12.4° C. The conversion material through the coil 11 was calculated to be 1.34 percent per pass. The product had a molecular weight of 280,000 and a number average molecular weight of 99,000 as determined by gel permeation chromatography.

EXAMPLE 5

Employing the apparatus of Example 1, a stream of 95 percent styrene and 5 percent ethylbenzene without initiator was fed through line 34 to the coil 11 at a rate of 129.6 pounds per hour. The temperature of the feedstream was 121° C. On obtaining equilibrium, the temperature of the reaction mixture at location A was 149.2° C.; at location B 150.4° C.; at location C 152.8° C.; and at location D 146.4° C. The solids in the reaction mixture at location A were 68.8 percent and the pressure in vessel 12 was 655 millimeters of mercury. Material was recirculated through the coil 11 at a rate of about 8300 pounds per hour. Condensate was returned to vessel 12 through line 32 at a rate of about 80 pounds per hour. The condensate had a temperature of 40° C. The conversion per pass was calculated to be 1.13 percent per hour. The product was of uniform good quality and had a weight average molecular weight of 230,000 and a number average molecular weight of 101,000 as determined by gel permeation chromatography.

EXAMPLE 6

The apparatus of Example 1 was employed to prepare styrene-acrylonitrile copolymer wherein the vessel 26 was used as a prepolymerizer. A feedstream of 22 percent ethylbenzene, 58.5 percent styrene and 19.5 percent acrylonitrile was fed to the vessel 26 at a rate of 120 pounds per hour. The temperature within the vessel 26 was 137.6° C. and the solids content was 33.3 percent. On obtaining equilibrium, the temperature at location A was 144.4° C.; at locations B and C 143.6° C.; and at location D the temperature was 144.2° C. Solids content in the reaction mixture at location A was 64 percent and the pressure within vessel 12 was 1,035 millimeters of mercury. The reaction mixture was recirculated through the coil 11 at a rate of about 8300 pounds per hour. About 84 pounds per hour of condensate was returned to the vessel 12 through the line 32. The condenser had a temperature of about 26.6° C. The conversion per pass through the coil 11 was calculated to be 0.444 percent per hour. The product was uniform and of acceptable commercial quality having a weight average molecular weight of 291,000 and a number average molecular weight of about 87,400.

In a manner similar to the foregoing samples, other polymers are readily prepared in accordance with the method of the present invention.

As is apparent from the foregoing specification, the present invention is susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention, excepting as it is set forth and defined in the hereto-appended claims.

What is claimed is:

1. In a continuous process for the polymerization of one or more polymerizable monomers which on polymerization liberate heat and form polymer wherein,
 a first stream portion containing polymerizable material is passed to a reactor to form a second stream portion,
 the reactor having the flow configuration of a closed loop,
 the second stream portion being circulated within and around the closed loop, the second stream portion being maintained at a polymerizing temperature to cause at least a portion of the polymerizable material to polymerize and form polymer,
 the polymer being soluble in the second stream portion, the second stream portion being maintained under
 a pressure sufficient to prevent vaporization thereof,
 removing a third stream portion from the reactor at a rate about equal to the rate of addition of the first stream portion, the third stream portion containing a greater amount of polymer than the first stream portion,
 the improvement which comprises providing within the loop of the reactor a region of lower pressure wherein a portion of the second stream portion vaporizes thereby removing a desired amount of heat from the second stream portion.

2. The method of claim 1 wherein the second stream portion is passed through the region of lower pressure in the form of a plurality of falling strands.

3. The method of claim 1 wherein at least a portion of the first stream is sprayed within the region of lower pressure.

4. The method of claim 1 wherein the portion of the second stream portion which is vaporized is condensed and returned to the second stream portion.

5. The method of claim 4 wherein styrene is a major component of the first stream portion.

6. The method of claim 5 wherein acrylonitrile is a minor component of the first stream portion.

7. In a continuous process for the polymerization of one or more polymerizable monomers which on polymerization liberate heat and form polymer wherein,
 a first stream portion containing polymerizable material is passed to a reactor to form a second stream portion,
 the reactor having the flow configuration of a closed loop,
 the second stream portion being circulated within and around the closed loop, the second stream portion being maintained at a polymerizing temperature to cause at least a portion of the polymerizable material to polymerize and form polymer,
 the polymer being soluble in the second stream portion, the second stream portion being maintained under
 a pressure sufficient to prevent vaporization thereof,
 removing a third stream portion from the reactor at a rate about equal to the rate of addition of the first stream portion, the third stream portion containing a greater amount of polymer than the first stream portion,
 the improvement which comprises providing within the loop of the reactor a region of lower pressure wherein the second stream is passed through the region of lower pressure as the plurality of falling strands and a portion of the second stream portion vaporizes thereby removing a desired amount of heat from the second stream portion, condensing the portion of the second portion which vaporizes and returning the condensed portion to the second stream portion.

* * * * *